Feb. 11, 1958 R. E. CRANDALL 2,823,035
TARGET TOWING AND EXCHANGE APPARATUS
Filed April 3, 1956
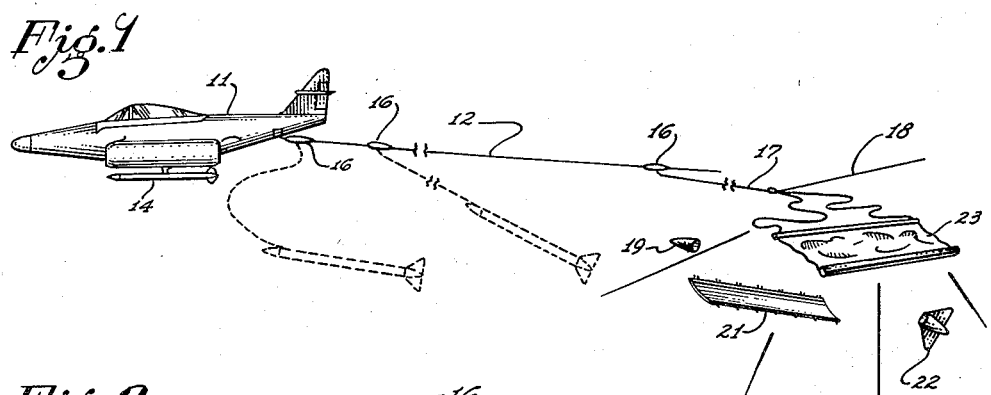
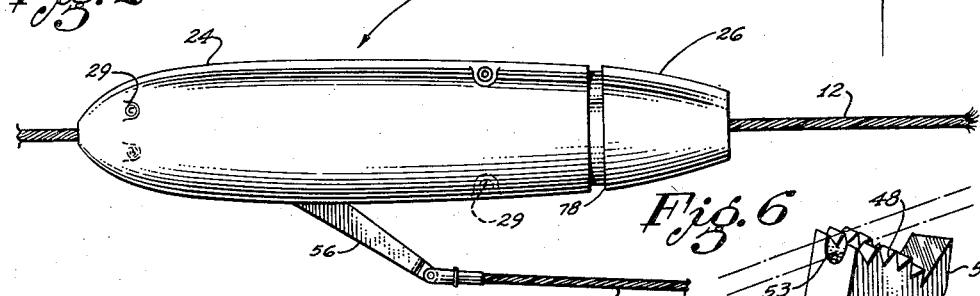
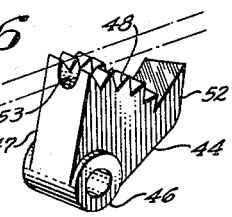
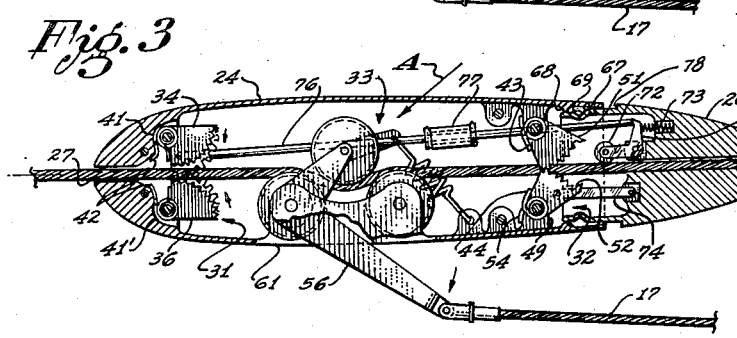
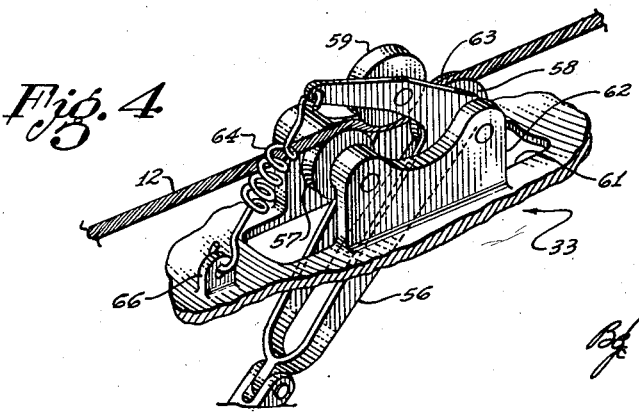
INVENTOR:
Ronald E. Crandall
Herbert E. Metcalf
His Patent Attorney United States Patent Office 2,823,035
Patented Feb. 11, 1958

2,823,035

TARGET TOWING AND EXCHANGE APPARATUS

Ronald E. Crandall, Los Angeles, Calif., assignor to Northrop Aircraft, Inc., Hawthorne, Calif., a corporation of California Application April 3, 1956, Serial No. 575,870

4 Claims. (Cl. 273—105.3)

This invention relates to target towing and exchange apparatus and more particularly to target towing and exchange apparatus facilitating the handling and replacement of targets or the like at the free end of a cable at such times as the cable is streamed from an airborne aircraft.

Currently the armed services utilize airborne targets extensively in the training of gunnery personnel and especially those engaged in the firing of ground-to-air and air-to-air rockets or missiles. If the above mentioned targets are to effectively simulate the flight pattern of high speed enemy aircraft it is necessary that equally high performing aircraft are utilized in towing these targets. Inasmuch as the flight time of a high performance aircraft is limited, especially when towing a military target or the like, it is extremely important that the original target or a replacement thereof be maintained on the firing range throughout as much of the flying time of the towing aircraft as possible. The foregoing is patricularly true in view of the fact that, in addition to the towing aircraft, other high performance fighter aircraft including one or more coordinating chase planes are airborne and all are expending valuable fuel and flying time.

Accordingly it is an object of the present invention to provide target towing and exchange apparatus the use of which reduces the time required to replace a target or the like at the free end of a cable streamed from an aircraft as compared with the time required to execute the same operation utilizing presently known techniques.

Another object is to provide target towing and exchange apparatus adapted to slide along a semitaut cable and which functions to fixedly attach itself thereto at such time as the apparatus contacts a sizable obstruction on, or reaches the free terminal end of, the cable.

Another object is to provide target towing and exchange apparatus adapted to slide along a semitaut cable and which functions to sever a portion of the cable at such time as the apparatus contacts a sizable obstruction on the cable.

Another object is to provide target towing and exchange apparatus adapted to slide along a semitaut cable and incorporates means maintaining the speed of the apparatus relative to the cable proportional to external forces acting on the apparatus.

Another object is to provide target towing and exchange apparatus especially adapted for use in replacing aerial targets at the free terminal end of a cable streamed from an aircraft which is entirely mechanical in its operation, which is simple in design and construction, which is comparatively light as compared with comparable apparatus, which may be reclaimed and reused, and which is economical to manufacture.

The above and other objects of the invention, also various uses and advantages of the invention, will manifest themselves as the disclosure progresses and particularly so when considered in connection with the accompanying drawing forming a part thereof.

In the drawings:

Figure 1 is a schematic side view of an airplane illustrating the operational steps in replacing an aerial target by means of the target towing and exchange device as disclosed herein.

Figure 2 is a side elevational view of the exchange device utilized in the exchange operation shown in Figure 1.

Figure 3 is a longitudinal cross-sectional view of the exchange device of Figure 2, the view being taken in the plane of the paper.

Figure 4 is a detail perspective view of the braking mechanism of the exchange device shown in Figures 2 and 3; the mechanism being viewed as indicated by the arrow A in Figure 3.

Figures 5 and 6 are respective detailed perspective views of one of the locking and one of the cutting members constituting components of the exchange device shown in Figures 2 and 3.

Throughout the specification and the appended claims the terms "target," "aerial target" or "military target" refer to a banner or the like streamed from an airborne aircraft by means of a cable. A banner thus streamed effectively simulates the flight pattern of an enemy aircraft and, therefore, provides a suitable moving target for either ground-to-air or air-to-air gunnery practice.

Referring to the drawing for a detailed description of a preferred embodiment of the present invention, Figure 1 shows an airborne jet type airplane 11 from which a towing cable 12 is streamed. A plurality of packaged banners 14 (only one of which is shown in Figure 1) and which subsequently become targets are normally attached to the under side of the airplane 11. Each of the packages 14 is releasable from the airplane 11 by releasing means (not shown) which is operable by the pilot of the airplane at such times as a replacement target is required. Upon the release of a packaged banner it falls away from the airplane and travels rearwardly along the cable 12 due to aerodynamic and gravitational forces acting thereon. The packaged banner is supported in its travel along the cable by means of a multi-purpose fitting 16 and a lanyard 17. As the fitting 16 approaches the end of the cable 12 it recognizes certain conditions prevailing at the cable's end and responds by fixedly attaching itself to the cable and under certain conditions severing the terminal end of the cable. The manner in which the fitting attaches itself to the cable 12 and performs other functions will become more apparent as the description progresses.

As the package banner 14 reaches the free terminal end of the cable 12 and is permanently attached thereto its inertia places a load on a leader 18 causing the individual parts of the package, indicated by the numerals 19, 21 and 22, to separate. Subsequently the banner unfurls and streams itself aft of the cable to become a target 23. Inasmuch as the packaged banner and the manner in which it opens constitutes no part of the present invention a further description in this connection is deemed unnecessary.

The fitting 16 consists of major and minor housings 24 and 26, respectively, which in their assembled relation define an assembly in which each of the housings are symmetrically positioned with respect to a longitudinal axis of the fitting 16 as indicated by the letter X. In their assembled relationship the major and minor housings have an overlapping relationship for a purpose which will be explained in detail presently. The nonadjacent ends of the major and minor housings 24 and 26 are solid except for aligned bores 27 and 28, respectively, in which the cable 12 is slideably received. It will be understood that the housing 26 precedes the housing 24 as the fitting 16 travels along the cable 12 in a direction toward the free end of the cable.

The major housing 24 of the fitting 16 is generally of cylindrical configuration being open at its overlapping end and having the aforementioned solid nose portion of ogive configuration as best seen in Figure 3. The major housing is divided longitudinally along a plane containing the axes X, the halves thus provided being secured together by bolts 29 or the like passing through the two halves. Pivotally mounted within the major housing 24 is a cable grab assembly 31, a cable cutting assembly 32, and a speed regulating assembly 33.

The assembly 31 consists of right and a left hand sector shaped member 34 and 36, respectively. The right hand member 34, as best seen in Figure 5, consists of a hub, gear sector and grab member 37, 38, and 39, respectively. The periphery of the gear sector 38 includes a set of spur teeth 40 all of which are located equal radial distances from the axis of the hub 37. The grab member 39 is of fan like configuration in side elevation and is provided with an arcuate surface. The arcuate surface of the grab member 39 is defined by a plurality of triangular shaped teeth 45 which have an eccentric relationship with respect to the teeth of the sector 38. The various components of the member 34 may be of integral or of built-up construction substantially as shown in Figure 5. The left hand grab member 36 is constructed similarly to the member 34 except that certain of the components thereof are reversed to render it a left hand member.

In their assembled positions the members 34 and 36 are mounted for pivotal movement about the respective axes of the hubs 37 on recessed portions 41 and 41' provided in the nose of the forward portion 24. The recessed portions 41 and 41' are located so that the grab members 39 are located on diametrically opposed sides of the axis X and therefore on opposite sides of the cable 12. Further in the assembled position of the members 34 and 36 the gear teeth of the sectors 38 are located at one side of the cable 12 and are in meshing relationship regardless of the angular positions of the members 34 and 36. The grab members have a first or free position in which the triangular teeth 45 are positioned a slight distance on each side of the cable 12 as shown in Figure 3. The grab members are normally retained in their free position by suitable spring means 42. From their free position it will be apparent that the members 34 and 36 may rotate in clockwise and counter-clockwise directions, respectively, to a second position in which they contact and arrest movement of the cable 12 relative to the fitting 16. Cable arresting movements and the function of the members 34 and 36 will be described later in greater detail.

The assembly 32 consists of a pair of sector shaped cutter members 43 and 44, respectively. The cutter member 44 includes a hub portion 46 and sector shaped portion 47 as best seen in Figure 6. The periphery of the portion 47 is defined by a plurality of wedge shaped teeth or serrations 48 all of which are spaced equal radial distances from the axis of the hub 46. The members 43 and 44 are identical except for the cutter blades 51 and 52 which extend radially from the portions 47 to provide shearing members. The blades 51 and 52 extend radially outwardly beyond the teeth 48 and are tapered laterally, in opposite directions with respect to respective cutter members substantially as shown, to provide the shearing action as the members 43 and 44 are oppositely rotated.

The cutter member 43 and 44 are mounted for pivotal movement on spaced lugs 49 extending inwardly from the cylindrical wall of the major housing 24 adjacent the aft end thereof. As best seen in Figure 3 the cutter members are positioned with respect to each other so that upon opposite angular movement thereof the teeth 48 engage and firmly grip the cable 12. Upon sufficient angular movement of the cutter members the blades 51 and 52 are moved into shearing relation with respect to each other and the end portion of the cable 12 will be severed. A tangential groove 53 is cut through the teeth 48 at the periphery of each of the members 43 and 44 at positions furthest spaced from the cutter blades 51 and 52. The cable 12 is received in this groove in passing through the fitting 16.

As mounted in the major housing 24 the cutter members are located respectively on opposite sides of the axis X and cable 12 in opposing relationship. The cutter members have a first position, substantially as shown in Figure 3, in which major portions of the sectors 47 are located to the right with respect to a plane containing their pivotal axes and the grooves 53 mate with each other to provide a circular passageway for the cable 12. The cutter members are normally retained in their first position by spring means 54 and stop means (not shown). Upon initial angular movement of the members 43 and 44 in clockwise and counter-clockwise directions, respectively, it will be apparent that the cable 12 will be firmly engaged by the teeth 48 and further angular movement of the cutter members will follow in response to movement of the cable 12 to the left. Initial movement is imparted to the member 44 in a manner to be explained presently and this initial movement is transferred to the member 43 due to partial inter-meshing of the teeth 48.

The major components of the speed regulating assembly 33 included are a bell crank 56 and three grooved pulleys 57, 58, and 59. An elongated longitudinally extending opening 61 is provided in the cylindrical wall of the major housing 24 at approximately the midpoint thereof. The pulleys 57 and 58 are mounted for rotary movement in flanges 62 extending inwardly with respect to the cylindrical wall of the major housing 24 and have a parallel relation with respect to each other. The bell crank 56 is bifurcated to provide legs which span the pulley 58 and is mounted for pivoted movement about the axis of the pulley 58. The inboard legs 63 of the crank 56 provide a suitable bearing support for the pulley 59. One of the legs 63 extends beyond the periphery of the pulley 59 and is apertured to receive one end of a helical wound tension spring 64. The other end of the spring 64 is received in an apertured leg 66 extending from the cylindrical wall of the major housing. The outer end of the crank 56 is pivotally attached to the end of the aforementioned lanyard 17.

In the assembled position of the assembly 33 the cable 12 is received in the peripheral grooves of the pulleys 57, 58, and 59. Under the above conditions, and with the tension in the cable not exceeding that under which it is normally expected to operate, the spring 64 is selected with sufficient force to urge the cable out of straight alignment substantially as shown in Figures 3 and 4. Thus the assembly 33 will offer a predetermined resistance to movement of the fitting 16 along the cable 12 depending on the strength of spring 64 and the stiffness of the cable 12. Accordingly by proper selection of the spring 64 the speed of the fitting 16 along the cable 12 may be maintained below a safe maximum speed at such times as the fitting is being used under normal operating conditions.

The outer surface of the aft end of the minor housing 26 is of proper size to be slideably received in the forwarded end of the major housing 24 to provide the aforementioned overlapping or telescopic portions. Shear pins 67 are provided to normally retain the major and minor housings 24 and 26 in a predetermined relationship. At such time as the pins 67 are sheared and the portions 24 and 26 are moved in a direction to increase their overlapping relationship, the projections 68 will bottom in an annular peripheral groove 69 formed in the extreme forward end of the portion 26.

A bell crank type rocker number 71, carrying a grooved pulley 72, is pivotally mounted in the portion 26. In the mounted position of the member 71 the roller 72 normally bears on the cable 12 and a coiled spring 73 acts to impart counter-clockwise movement to the rocker arm at such time as the cable is removed and no longer blocks movement of the roller 72. A pivotally mounted pusher type rod 74 extends between the minor housing 26 and the cutter member 44. Likewise a pusher type rod 76 extends between the upstanding arm of the rocker arm 71 and the grab member 34. The rod 76 is supported by a resilient support member 77 with one of its ends pivotally attached to the grab member 34 and its other end held in contacting relation with the upstanding arm of the rocker member 71.

The component parts of the fitting 16 and their relationship having been described a better understanding of the fitting and the manner in which it functions will be forthcoming from the following explanation of the various positions assumed by the assemblies 31 and 32 and by a description of a target streaming operation. During a target streaming operation the assemblies 31 and 32 are caused to assume an initial position, a cable gripping position, and in some instances a final position. The respective initial positions of the assemblies 31 and 32 are characterized in that the eccentrically positioned teeth 40—40 of the assembly 31, also the blades 51 and 52 of the assembly 32, are spaced apart substantially as shown in Figure 3. At such time as relative inward movement occurs between the housings 24 and 26, that is in a direction causing the open end of the housing 24 to become bottomed on the annular shoulder 78, the assemblies 31 and 32 are caused to assume their cable gripping positions. In the latter position the teeth 40 of the assembly 31 have assumed a firm gripping and wedging relation on the cable 12 and the blades 51 and 52 have moved into shearing relation. The assemblies 31 and 32 are caused to assume their cable gripping positions due to the thrust imparted to the rods 74 and 76 as the aforementioned relative movement between the housings 24 and 26 occurs. After the assemblies 31 and 32 have reached their cable gripping positions and the cable 12 has been severed, thereby releasing a previous fitting carrying a destroyed target, further relative movement may occur between the cable and the fitting 16. If such movement does occur at least the assembly 31 will be moved into a final position due to the pull of the cable 12. In this latter position the teeth 40 will be more firmly and completely imbedded in the cable 12 than in the cable gripping position thereof.

First it is assumed that a target 23 has been damaged, for example, by rocket or gun fire and must, therefore, be replaced. Under such conditions a packaged banner 14 is released by the pilot of the aircraft 11. The packaged banner falls away from the aircraft and under the influences of aerodynamic drag and gravitational forces acting thereon begins its travel in an aft direction along the cable 12. During this phase of the operation the speed of the fitting 16 will be maintained below a safe predetermined maximum, by the speed regulating assembly 33, in a manner previously explained.

At such time as the fitting 16 reaches the end of the cable 12 the forward end of the housing 26 contacts the nose of the fitting supporting the destroyed target. The pins 67 are sheared, due to the inertial forces of the fitting 16, thereby permitting relative movement to occur between the housings 24 and 26. The above relative movement is arrested as the forward end of the housing 24 is bottomed on the peripheral shoulder 78 of the housing 26. Simultaneously the projections 68 are bottomed in the groove 69 and function to secure the major and minor housings 24 and 26 together and be retained in this relationship should it become necessary to exchange the replacement fitting at a future time.

As the above described relative movement occurs angular movement is imparted to the grab and cutter assemblies 31 and 32 by the rods 76 and 74, respectively. This angular movement causes the assemblies 31 and 32 to assume their respective cable gripping positions in which the teeth of these assemblies are moved into firm contacting or wedging relation with the cable 12. Accordingly the cable 12 is first severed by the blades 51 and 52 and almost simultaneously but slightly thereafter the triangular teeth on the members 34 and 36 grab the cable 12 and function to arrest further travel of the cable through the fitting 16. The latter operation being effected due to the eccentricity of the teeth 45 with respect to the axes of the hubs 37 as previously explained.

The cable 12 being severed the old target and fitting now falls away and the new target is unfurled and streamed in the manner previously explained in connection with Figure 1. At this time, that is as the old fitting falls away, a slight additional movement of the new fitting 16 in an aft direction along the cable 12 may or may not occur. If such a movement does occur at this time the cable pull will result in the assemblies 31 and 32 assuming their aforementioned respective final positions in which further relative movement of the fitting 16 on the cable 12 is definitely precluded.

Other conditions may prevail in which the cable 12 has been parted by rocket or gun fire and a new target must be placed at the end of the cable 12. This operation is similar to the one previously described, however, the previous fitting is not on the cable and the new fitting must, therefore, recognize different conditions as the new fitting approaches the end of the cable. As the end of the cable passes inwardly through the bore 28 the cable will no longer resist angular movement of the rockerarm 71. The spring 73 now urges the arm 71 in a counterclockwise direction and the rod 76 in a forward direction. This operation imparts the previously described angular movement to the grab assembly 31 which causes the grab members 34 and 36 to assume their cable gripping and subsequently their final positions to effectively arrest further movement of the fitting 16 on the cable 12.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. Target towing and exchange apparatus comprising: major and minor cylinder-like housings each having an open end and a partially closed end; said housings being secured together at their open ends in slideable overlapping relation to allow relative movement therebetween and to maintain said housings in axial alignment to define a continuous fitting; the partially closed ends of said housings define respective bores the axis of which coincide wtih the axis of said fitting and through which a cable may be threaded; a pair of grab members each having eccentric serrated surfaces; one of said grab members being pivotally mounted on each side of the axis of said fitting at a position adjacent the closed end of said major housing; a pair of cutter members each including a cutting blade; one of said cutter members being pivotally mounted on each side of the axis of said fitting at a position adjacent the open end of said major housing; said grab and cutter members being pivotally mounted for pivotal movement between respective initial and cable gripping positions; and rod and lever means attached to said grab and cutter members and abutting the end wall of said minor housing and which are responsive to said relative movement to move said grab and cutter members from their respective initial to their cable gripping positions.

2. Apparatus as set forth in claim 1 further characterized in that each of said grab members and each of said cutter members includes a gear-like sector having teeth on their respective outer peripheries, and said teeth on said grab members and the teeth on said cutter members being in meshing relation as said grab and cutter members move between their respective initial and cable gripping positions.

3. Apparatus as set forth in claim 2 further characterized in that said rod and lever means include a first rod the ends of which are respectively pivotally attached to the partially closed end of said minor housing and one of said cutter members and a second rod one end of which is pivotally attached to one of said grab members and the other end abuts a compression spring mounted in the closed end of said minor housing.

4. Apparatus as set forth in claim 3 further characterized in that said rod and lever means includes a bell crank type rocker arm pivotally mounted in the minor housing and adapted to move between a cocked and a triggered position, one end of said arm carrying a roller adapted to ride on said cable, and maintain said arm in its cocked position, at such times as said cable is threaded through said bores and the other end of arm is positioned between the end of said second rod abutting said spring and the free end of said spring.

References Cited in the file of this patent
UNITED STATES PATENTS

| | | |
|---|---|---|
| 2,385,813 | Jessen | Oct. 2, 1945 |
| 2,489,632 | Frieder | Nov. 29, 1949 |
| 2,567,170 | Aiken | Sept. 11, 1951 |